US006666268B2

(12) United States Patent
Griffith et al.

(10) Patent No.: US 6,666,268 B2
(45) Date of Patent: *Dec. 23, 2003

(54) METHODS AND OIL-BASED SETTABLE DRILLING FLUID COMPOSITIONS FOR DRILLING AND CEMENTING WELLS

(75) Inventors: James E. Griffith, Duncan, OK (US); Jiten Chatterji, Duncan, OK (US); Bobby J. King, Duncan, OK (US); John L. Dennis, Jr., Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,166

(22) Filed: Dec. 16, 2002

(65) Prior Publication Data

US 2003/0116065 A1 Jun. 26, 2003

Related U.S. Application Data

(60) Continuation-in-part of application No. 09/955,000, filed on Sep. 18, 2001, now Pat. No. 6,524,384, which is a division of application No. 09/626,374, filed on Jul. 26, 2003, now Pat. No. 6,315,042.

(51) Int. Cl.$^7$ .............................................. E21B 33/13
(52) U.S. Cl. ....................................... 166/292; 166/293
(58) Field of Search ................................ 166/292, 293

(56) References Cited

U.S. PATENT DOCUMENTS

| | | | |
|---|---|---|---|
| 2,219,325 A | 10/1940 | Maness ........................ 166/21 |
| 2,815,294 A | 12/1957 | Havelin et al. ............. 106/118 |
| 2,848,051 A | 8/1958 | Williams ..................... 166/28 |
| 3,145,774 A | 8/1964 | Patchen et al. ............... 166/31 |
| 3,557,876 A | 1/1971 | Tragesser ................... 166/292 |
| 3,625,286 A | 12/1971 | Parker ........................ 166/291 |
| 3,863,718 A | 2/1975 | Bruist ........................ 166/285 |
| 3,865,601 A | 2/1975 | Serafin et al. ................ 106/95 |
| 4,210,457 A | 7/1980 | Dodson et al. ................ 106/97 |
| RE31,190 E | 3/1983 | Detroit et al. ............... 166/293 |
| 4,555,269 A | 11/1985 | Rao et al. ..................... 106/90 |
| 4,671,357 A | 6/1987 | Binder, Jr. .................. 166/291 |
| 4,676,317 A | 6/1987 | Fry et al. .................... 166/293 |
| 4,772,330 A | 9/1988 | Kobayashi et al. .......... 106/400 |
| 4,924,942 A | 5/1990 | Shen .......................... 166/291 |
| 4,997,484 A | 3/1991 | Gravitt et al. .............. 106/708 |
| 5,018,906 A | 5/1991 | Bonier-Sahuc .............. 405/263 |
| 5,028,271 A | 7/1991 | Huddleston et al. ........ 106/720 |
| 5,176,910 A | 1/1993 | McCaman et al. ............ 424/92 |
| 5,213,160 A | 5/1993 | Nahm et al. ................. 166/293 |
| 5,295,543 A | 3/1994 | Terry et al. ................. 166/293 |
| 5,327,968 A | 7/1994 | Onan et al. ................. 166/293 |
| 5,337,824 A | 8/1994 | Cowan ........................ 166/293 |
| 5,355,955 A | 10/1994 | Rodrigues et al. .......... 166/293 |
| 5,383,521 A | 1/1995 | Onan et al. ................. 166/293 |
| 5,458,195 A | 10/1995 | Totten et al. ................ 166/293 |
| 5,464,060 A | 11/1995 | Hale et al. ................... 166/293 |
| 5,472,051 A | 12/1995 | Brothers ..................... 166/293 |
| 5,499,677 A | 3/1996 | Cowan ........................ 166/293 |
| 5,501,277 A | 3/1996 | Onan et al. ................. 166/293 |
| 5,555,937 A | 9/1996 | Fisk, Jr. et al. ............. 166/301 |
| 5,585,333 A | 12/1996 | Dahl et al. .................. 507/103 |
| 5,711,383 A | 1/1998 | Terry et al. .................. 175/72 |
| 5,851,960 A | 12/1998 | Totten et al. ................ 507/118 |
| 5,909,774 A | 6/1999 | Griffith et al. .............. 166/312 |
| 5,988,279 A | 11/1999 | Udarbe et al. .............. 166/293 |
| 6,138,759 A | 10/2000 | Chatterji et al. ............ 166/293 |
| 6,271,181 B1 | 8/2001 | Chatterji et al. ............ 507/209 |
| 6,315,042 B1 * | 11/2001 | Griffith et al. .............. 166/291 |
| 6,524,384 B2 * | 2/2003 | Griffith et al. .............. 106/705 |

\* cited by examiner

*Primary Examiner*—Paul Marcantoni
(74) *Attorney, Agent, or Firm*—Craig W. Roddy; C. Clark Dougherty, Jr.

(57) ABSTRACT

Methods for drilling well bores and cementing a pipe string in the well bores using oil-based settable drilling fluids are provided. The oil-based settable drilling fluid compositions basically comprise an oil external emulsion comprising oil, water and an emulsifying surfactant; a hydraulically settable component; and a de-emulsifying surfactant for de-emulsifying the oil-external emulsion when the emulsion is cured.

54 Claims, No Drawings

METHODS AND OIL-BASED SETTABLE DRILLING FLUID COMPOSITIONS FOR DRILLING AND CEMENTING WELLS

CROSS-REFERENCE TO RELATED APPLICATIONS

This Application is a Continuation-In-Part of application Ser. No. 09/955,000 filed on Sep. 18, 2001 now U.S. Pat. No. 6,524,384, which is a Divisional of Ser. No. 09/626,37 filed on Jul. 26, 2000 now U.S. Pat. No. 6,315,042 B1 issued on Nov. 13, 2001.

BACKGROUND OF THE INVENTION

1. Field of the Invention

This invention relates to methods and oil-based settable drilling fluid compositions for drilling and cementing wells.

2. Description of the Prior Art

Hydraulic cement compositions are commonly utilized in the construction of oil and gas wells. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

A variety of drilling fluids are used in drilling wells. Oil-based drilling fluids are commonly used in applications where the permeabilities of producing formations would be damaged if the formations were contacted by water-based drilling fluids. However, it has heretofore been common place in the industry to use water-based settable spotting fluids which are incompatible with the oil-based drilling fluids and often cause well bore stability problems and damage to the permeability of producing formations.

During the drilling of a well bore, the drilling fluid used is circulated through the drill pipe and drill bit and then upwardly through the well bore to the surface. The drilling fluid functions to lubricate the drill bit and carry cuttings to the surface where the cuttings and gas are removed from the drilling fluid. Heretofore, drilling fluids were not settable, i.e., they did not set into hard impermeable sealing masses when static. However, conventional drilling fluids do generally increase in gel strength over time. Typically, after a well bore is drilled to total depth, the drill pipe and drill bit are withdrawn from the well bore and the drilling fluid is left in the well bore to provide hydrostatic pressure on permeable formations penetrated by the well bore thereby preventing the flow of formation fluids into the well bore.

The next operation in completing the well bore usually involves running a pipe string, e.g., casing, into the well bore. Depending upon the depth of the well bore and whether or not problems are encountered in running the pipe string therein, the drilling fluid may remain relatively static in the well bore for a time period up to 2 weeks. During that time, the stagnate, conventional drilling fluid progressively increases in gel strength whereby portions of the drilling fluid in the well bore become increasingly difficult to displace during the cementing process.

After the pipe string has been run in the well bore, the next operation performed is usually primary cementing. That is, the pipe string disposed in the well bore is cemented by pumping a cement composition through the pipe string and into the annulus between the pipe string and the walls of the well bore whereby the drilling fluid in the annulus is displaced therefrom by the cement composition. While a variety of techniques have been developed for improving the displacement of the drilling fluid from the annulus, if the drilling fluid has developed gel strength due to remaining static in the well bore for a long period of time, portions of the drilling fluid in the well bore are bypassed by the cement composition. Since the conventional drilling fluid is not settable, i.e., it does not set into a rigid mass, formation fluids enter and flow in the well bore and this is highly undesirable.

Heretofore, settable spotting fluid compositions have been developed and used in wells for various purposes including the early displacement of drilling fluids from well bores. Water-based settable spotting fluids have included blast furnace slag and other hydraulic components which slowly set at relatively low temperatures. Slag-containing settable spotting fluids are intolerant to cement contamination; i.e., if well cement mixes with such spotting fluids, the spotting fluids prematurely set. To prevent a slag-containing spotting fluid from prematurely setting, a very strong set retarder must be added to the spotting fluid and the spotting fluid must be separated from the cement composition by a spacer fluid. If intermixing between the cement composition and the set retarded fluid occurs, the cement composition may be prevented from setting by the strong set retarder in the spotting fluid.

Oil-based settable spotting fluids have been developed which can be utilized in wells drilled with oil-based fluids and avoid well cementing problems of the types described above. However, the use of spotting fluids is an additional step in the process and may still leave some fractures with conventional, unsettable drilling fluid. Thus, there are needs for settable drilling fluid compositions which can be used for both drilling and cementing and that can avoid the problems described above.

SUMMARY OF THE INVENTION

By the present invention, methods of using oil-based settable drilling fluids and oil-based settable drilling fluid compositions are provided which meet the above described needs and overcome the deficiencies of the prior art. The methods of drilling a well bore and cementing a pipe string in the well bore basically comprise the following steps. An oil-based settable drilling fluid is prepared comprising an oil external emulsion which comprises oil, water and an emulsifying surfactant; a hydraulically settable component; and a de-emulsifying surfactant for de-emulsifying the oil-external emulsion when the emulsion is cured. The oil-based settable drilling fluid composition is then used to drill the well bore. The pipe string to be cemented is run into the well bore, the settable drilling fluid is displaced out of the pipe string and the settable drilling fluid in the annulus between the pipe string and the walls of the well bore is allowed to set into a hard impermeable mass.

The oil-based settable spotting fluid compositions of this invention for use in drilling and cementing wells basically comprise the following components: an oil external emulsion comprising oil, water and an emulsifying surfactant; a hydraulically settable component; and a de-emulsifying surfactant for de-emulsifying the oil-external emulsion when the emulsion is cured.

The objects, features and advantages of the present invention will be readily apparent to those skilled in the art upon a reading of the description of preferred embodiments which follows.

DESCRIPTION OF PREFERRED EMBODIMENTS

Preferred methods of this invention for drilling well bores and cementing pipe strings in the wells basically comprise the following steps. An oil-based settable drilling fluid is prepared comprising an oil external emulsion which comprises oil, water and an emulsifying surfactant; a hydraulically settable component; and a de-emulsifying surfactant for de-emulsifying the oil-external emulsion when the emulsion is cured. The oil-based settable drilling fluid composition is then used to drill the well bore. The pipe string to be cemented is run into the well bore. Drilling fluid is displaced out of the pipe string, and the settable drilling fluid in the annulus between the pipe string and the walls of the well bore is allowed to set into a hard impermeable mass.

The oil-based settable drilling fluid is prepared by combining a known volume of oil and emulsifying surfactant, or surfactants, which are completely mixed with the oil for uniform dispersion of the surfactant(s) in the oil. An activator, if present, is added to a known volume of water to form a slurry. The water slurry is added to the oil containing the surfactant(s) and the resulting mixture is agitated until a smooth oil-external emulsion is formed. To the emulsion is added the hydraulic material. The emulsion and hydraulic material are completely mixed to form a uniform dispersion of all the ingredients. This is followed by the addition of the required amount of de-emulsifier to the oil-external emulsion. Curing at formation temperature and pressure causes the oil external emulsion to break and release the hydraulic material which sets up as an impermeable mass.

The term "oil external emulsion" is used herein to refer to the emulsion formed from oil, water and emulsifying surfactant, prior to addition of hydraulic material. The term "oil-based settable drilling fluid composition(s)" is used herein to mean a fluid which can be used for drilling and which over time will harden into an impermeable mass having sufficient compressive strength to prevent the undesirable inflow or outflow of fluids into the well bore or subterranean formation, but which will not set for a desired relatively long period of time in the range of from about 2 days to about 2 weeks or more. During this time the well bore can be drilled and other operations can be performed, such as placing a pipe string or casing.

Suitable oils which can be utilized for preparing the settable drilling fluid compositions of this invention include, but are not limited to, diesel oil, internal olefins, mineral oil and long chain esters. Of these, internal olefins are preferred. The oil used is generally present in the oil external emulsion in an amount in the range of from about 50% to about 90% by volume thereof, more preferably from about 60% to about 80%.

The water utilized in the oil-based settable drilling fluid compositions of this invention can be fresh water or salt water depending upon the particular density of the composition required. The term "salt water" is used herein to mean unsaturated salt water or saturated salt water including brines and seawater. Generally, the water is present in the oil external emulsion in an amount in the range of about 5% to about 45% by weight thereof, more preferably from about 20% to about 40%.

Emulsifying surfactants for emulsifying the oil with water which can be utilized include, but are not limited to, tall oil diethanolamides and a blend of oxidized tall oil fatty acids. A particularly suitable such emulsifying surfactant is a tall oil diethanolamide of the formula $RCON(CH_2CH_2OH)_2$ wherein R is a $C_{18}$ to $C_{20}$ alkyl radical which is commercially available under the trade designation "AMIDEX™" from Chemron Corporation of Paso Robles, Calif. Another particularly suitable such emulsifying surfactant is a blend of oxidized tall oil fatty acids which is commercially available under the trade designation "OTO MOD #4™" from Expo Chemical Co. Inc., of Houston, Tex. Tall oil primarily consists of 50% unsaturated fatty acids, chiefly oleic and linoleic acids, and 50% resin acids. Resin acids primarily consist of 90% isomeric abietic acids and 10% is a mixture of dihydroabietic acid and dehydoabietic acids. When used, the tall oil diethanolamide emulsifying surfactant is generally present in the oil external emulsion in an amount in the range of from about 2.3% to about 7.5% by weight thereof. When used, the oxidized tall oil containing oxidized fatty acid blends emulsifying surfactant is generally present in an amount in the range of from about 1% to about 1.6% by weight of the oil in the composition.

Examples of hydraulically settable components that can be used include, but are not limited to, ASTM Class F or the equivalent fly ash together with lime, Portland cement, blast furnace slag, a mixture of silica fume, pozzolan and lime, a mixture of Portland cement and blast furnace slag, and a mixture of Portland cement and pozzolan. Generally, the hydraulically settable component is present in the composition in an amount in the range of from about 100% to about 250% by weight of the oil external emulsion.

ASTM Class F fly ash does not contain lime, and a source of calcium ion is required for it to form a cementitious composition with water. Generally, lime is mixed with ASTM Class F or the equivalent fly ash in an amount in the range of from about 10 to about 30% by weight of the fly ash. Generally the lime and fly ash are present in the composition in an amount in the range of from about 100% to about 200% by weight of the oil external emulsion.

Portland cement is readily available commercially and is made by sintering a source of lime and silica. The Portland cement utilized is generally present in the composition in an amount in the range of from about 100% to about 225% by weight of the oil external emulsion.

Blast furnace slag, as used herein, means a granulated, blast furnace by-product formed in the production of cast iron and broadly comprising the oxidized impurities found in iron ore. The blast furnace slag utilized is generally present in the composition in an amount in the range of from about 100% to about 250% by weight of the oil external emulsion.

Silica fume, also known as condensed silica fume, amorphous silica, silica dust or volatilized silica, is an ultra fine powder by-product material produced in the manufacture of silicon and ferrosilicon. Pozzolan is broadly defined as finely divided siliceous or siliceous and aluminous material that will combine with calcium hydroxide in the presence of water to form a stable compound possessing cementing properties. When a mixture of silica fume, pozzolan and lime is utilized, the mixture generally has a weight ratio of silica fume to pozzolan of about 40:60. Generally lime is added to the mixture in an amount of about 15% by weight of the silica fume and pozzolan. The mixture of silica fume and pozzolan is generally present in the composition in an amount in the range of from about 100% to about 200% by weight of the oil external emulsion.

When a mixture of Portland cement and blast furnace slag is utilized, the mixture generally has a weight ratio of Portland cement to blast furnace slag in the range of from about 80:20 to, more preferably, about 60:40. When utilized, the mixture of Portland cement and blast furnace slag is generally present in the composition in an amount in the range of from about 100% to about 250% by weight of the oil external emulsion.

When a mixture of Portland cement and pozzolan is utilized, the mixture generally has a weight ratio of Portland cement to pozzolan of about 50:50. When utilized, the mixture of Portland cement and pozzolan is generally present in the composition in an amount in the range of from about 100% to about 200% by weight of the oil external emulsion.

Various de-emulsifying surfactants can be used for de-emulsifying the oil-external emulsions when the emulsions are contacted with external water. Such de-emulsifying surfactants include, but are not limited to ethoxylated nonylphenol, quaternized triethanolamine condensate polymer and triethanolamine condensate polymer. A particularly suitable such emulsifying surfactant is an ethoxylated nonylphenol mixture containing 4 moles of ethoxylated nonylphenol and 9 moles of a commercially available ethoxylated nonylphenol which is commercially available under the trade designation "NP-49™" from Union Carbide of Houston, Tex. Another particularly suitable such de-emulsifying surfactant is a quaternized triethanolamine condensate polymer which is commercially available under the trade designation "CLEARBREAK RT-33™" from Chemron Corporation of Paso Robles, Calif. A similarly suitable de-emulsifying surfactant is a triethanolamine condensate polymer commercially available under the trade designation "CLEARBREAK RT-623™," also from Chemron Corporation. When used, the ethoxylated nonylphenol de-emulsifying surfactant is generally present in the oil-based settable spotting fluid of this invention in an amount in the range of from about 0.3% to about 2.5% by weight of the oil external emulsion. When used, the triethanolamine and the quaternized triethanolamine condensate polymer de-emulsifying surfactants are present in an amount in the range of from about 0.3% to about 3.0% by weight of the oil external emulsion.

Although many emulsifying and de-emulsifying surfactants can be used, the surfactants described above are preferred, in part, because they achieve an emulsion with a predictable de-emulsifying time for a variety of base oils and temperatures. They also function well with diesel and kerosene as the base oil as well as other base oils that were previously considered impossible to create settable drilling fluids from.

The resulting oil-based settable drilling fluid is a slurry generally having a density in the range of from about 11 to about 13 pounds per gallon and more preferably from about 11.5 to about 12 pounds per gallon.

In order to prevent foaming when the oil-external emulsion is formed with water, a defoaming agent can optionally be included in the composition of this invention. While various defoaming agents can be used, a preferred defoaming agent comprises polypropylene glycol, particulate hydrophobic silica and a liquid diluent. Such a defoaming agent is commercially available under the trade designation "D-AIR 3000 L™" from Halliburton Energy Services Corporation of Duncan, Okla. When used, the defoaming agent is generally present in an amount in the range of from about 0.01% to about 0.1% by weight of the composition.

In accordance with the methods of the present invention, a well bore is drilled with an oil-based settable drilling fluid to total depth. After the well bore is drilled, the pipe string to be cemented is run in the well bore. The settable drilling fluid composition does not increase in gel strength with time and it is easily circulated after being static in the well bore for a long period of time, e.g., a time period of two weeks or more.

When the pipe string is in place, a non-settable displacement fluid is used to displace the settable drilling fluid out of the pipe string. The annulus between the pipe string and the walls of the well bore is filled with settable drilling fluid which is allowed to set by curing at formation temperature and pressure for a predetermined length of time. The set time is adjusted for a particular well by changing the concentrations of emulsifying and de-emulsifying surfactants present in the drilling fluid composition. The settable drilling fluid can also be set by contaminating it with a small amount of cement slurry. Upon setting, the drilling fluid in the annulus and in any fractures or other permeable zones therein becomes a hard impermeable mass, thereby preventing the entry or flow of formation fluids in the annulus.

In a preferred embodiment of this invention, the hydraulically settable component utilized is one that can be activated by calcium chloride, zinc acetate, zinc formate or mixtures thereof. A preferred such hydraulically settable component is Portland cement. The Portland cement is primarily present in the oil phase of the emulsion while the activator is primarily present in the aqueous phase of the emulsion. When the emulsion breaks, the Portland cement is activated by the water and by the activator, i.e., the reaction is kinetically enhanced by the activator. The activator is generally present in the composition of this embodiment in an amount in the range of from about 2% to about 4% by weight of the hydraulically settable component.

In yet another preferred embodiment of this invention, the hydraulically settable component utilized is one that can be activated by calcium hydroxide, sodium hydroxide, sodium silicate or mixtures thereof. A preferred such hydraulically settable component is blast furnace slag. The blast furnace slag is primarily present in the oil phase of the emulsion while the activator is primarily present in the aqueous phase of the emulsion. When the emulsion breaks, the blast furnace slag is activated by the water and by the activator. The activator is generally present in the composition of this embodiment in an amount in the range of from about 2.5% to about 15% by weight of the hydraulically settable component.

In still another preferred embodiment of this invention, the hydraulically settable component utilized comprises a mixture of silica fume, pozzolan and lime having a weight ratio of silica fume to pozzolan of about 40:60. The mixture of silica fume and pozzolan is primarily present in the oil phase of the emulsion while the lime activator is primarily present in the aqueous phase of the emulsion. When the emulsion breaks, the mixture of silica fume and pozzolan is activated by the lime present in water. The lime activator is generally present in the composition of this embodiment in an amount of about 15% by weight of the silica fume and pozzolan.

In another preferred embodiment of this invention, the hydraulically settable component comprises a mixture of Portland cement and blast furnace slag having a weight ratio of Portland cement to blast furnace slag in the range of from about 80:20 to about 60:40. The mixture of Portland cement and blast furnace slag is primarily in the oil phase of the emulsion. The water phase contains hydrated lime activator in an amount in the range of from about 5% to about 10% by weight of the mixture of Portland cement and blast furnace slag. When the emulsion breaks, lime present in the Portland cement is released by hydration and, in turn, sets up the slag. The hydrated lime activator kinetically enhances the reaction.

In yet another preferred embodiment of this invention, the hydraulically settable component comprises a mixture of Portland cement and pozzolan having a weight ratio of Portland cement to pozzolan of about 50:50. The water phase contains hydrated lime activator in an amount in the range of from about 2.5% to about 5% by weight of the mixture of Portland cement and pozzolan. When the emulsion breaks, the mixture of Portland cement and pozzolan is activated by lime released by hydration of Portland cement. The hydrated lime activator kinetically enhances the reaction.

A preferred method of this invention for drilling a well bore and cementing a pipe string in the well bore comprises the following steps: (a) preparing an oil-based settable drilling fluid composition comprising an oil external emulsion which comprises oil, water and an emulsifying surfactant; a hydraulically settable component; and a de-emulsifying surfactant for de-emulsifying the oil-external emulsion when the emulsion is cured; (b) drilling the well bore using the settable drilling fluid composition; (c) running the pipe string to be cemented into the well bore; (d) displacing the settable drilling fluid composition out of the pipe string; and (e) allowing the settable drilling fluid composition in the annulus between the pipe string and the walls of the well bore well, as well as any drilling fluid in the fractures or other permeable zones therein to set into a hard impermeable mass.

A preferred oil-based settable drilling fluid composition for use in drilling well bores and cementing pipe string in the well bores comprises an oil external emulsion which comprises oil, water and an emulsifying surfactant or surfactants; a hydraulically settable component; and a de-emulsifying surfactant for de-emulsifying the oil-external emulsion when the emulsion is cured.

The oil-based settable drilling fluid is prepared by combining a known volume of oil and emulsifying surfactant, or surfactants, which are completely mixed with the oil for uniform dispersion of the surfactant(s) in the oil. The activator, when used, is added to a known volume of water to form a slurry. The water slurry is added to the oil containing the surfactant(s) and the resulting mixture is agitated until a smooth oil-external emulsion is formed. To the emulsion is added the hydraulic material. The emulsion and hydraulic material are completely mixed to form a uniform dispersion of all the ingredients. This is followed by the addition of the required amount of de-emulsifier to the oil-external emulsion. Curing at formation temperature and pressure will cause the oil external emulsion to break and release the hydraulic material which will set up as an impermeable mass.

In order to further illustrate the methods and compositions of the present invention, the following examples are given.

EXAMPLE 1

The following experiment illustrates the versatility of the invention and specifically the effect of de-emulsifier concentration on the time required to set the hydraulic material. An oil based composition of this invention was prepared by the following procedure. To 350 mL of diesel was added 16 mL of emulsifier comprising tall oil diethanolamide and 0.5 mL of an emulsifier comprising a blend of oxidized tall oil fatty and rosin acids. The mixture was thoroughly mixed to obtain a uniform dispersion of surfactants in diesel. Next, 80 g of hydrated lime was added to 233 g of water and agitated vigorously. This water slurry was added to the diesel containing the surfactants. The mixture was agitated until a smooth oil external emulsion was formed. To this emulsion was added a mixture of 600 g fly ash and 400 g iron oxide and this emulsion was again thoroughly mixed.

Following the addition of 20 mL of ethoxylated nonylphenol de-emulsifier to the oil external emulsion, the mixture was cured at 295° F. and 3000 psi. The oil based external emulsion broke at the end of 7 days releasing the hydraulic materials. The hydraulic materials set up as a hard mass.

The experiment was repeated and this time 40 mL of ethoxylated nonylphenol de-emulsifier were added to the oil external emulsion. The mixture was cured at 295° F. and 3000 psi. The oil based external emulsion broke and at the end of 6 days the hydraulic materials were set hard.

EXAMPLE 2

The following experiment further illustrates the versatility of the invention. A composition of this invention was contaminated with various amounts of cement slurry in order to mimic possible field conditions. A composition of this invention was prepared using the following procedure. To 350 mL of diesel oil was added 5 mL of emulsifier comprising a blend of oxidized tall oil fatty and rosin acids. Three g of calcium chloride were dissolved in 150 mL of water and added to the diesel containing the emulsifier. The mixture was vigorously agitated until a smooth oil external emulsion was formed. Then 5 g of oleophilic clay, 600 g Portland Class H cement and 5 mL de-emulsifier comprising quaternized triethanol amine condensate were added to the emulsion. The emulsion was again agitated thoroughly to uniformly mix all the ingredients.

The oil external emulsion was divided into four parts, designated as slurry 1, 2, 3 and 4. Slurry 1 was contaminated with a cement slurry in an amount equal to 50% by weight of the emulsion. The slurry set in 3 hours at 125° F.

Slurry 2 was contaminated with a cement slurry in an amount equal to 25% by weight and did not set for 24 hours. At the end of 48 hours, Slurry 2 was set up as a hard mass.

Slurry 3 stayed fluid for 72 hours at 125° F. The temperature was raised to 170° F. following the addition of an extra 5 mL of quaternized triethanol amine condensate de-emulsifier. At the end of 7 days, the slurry was contaminated with a trace amount of cement slurry. At the end of 14 days, a hard set resulted.

After three days at 125° F., Slurry 4 was treated with 10 mL of quaternized triethanol amine condensate de-emulsifier and the temperature was increased to 170° F. The slurry stayed fluid for 14 days in spite of the significant increase in de-emulsifier concentration.

The above experiment illustrates the effects of contamination, temperature and de-emulsifier concentration on set time and demonstrates that set time can be varied to meet the needs and demands of a particular well.

Thus, the present invention is well adapted to attain the objects and advantages mentioned as well as those that are inherent therein. While numerous changes may be made by those skilled in the art, such changes are encompassed within the spirit of this invention as defined by the appended claims.

What is claimed is:

1. A method of drilling a well bore and cementing a pipe string in said well bore comprising the steps of:
   preparing an oil-containing settable drilling fluid composition comprising an oil external emulsion which comprises oil, water and an emulsifying surfactant; a hydraulically settable component; and a de-emulsifying surfactant for de-emulsifying said oil-external emulsion when the emulsion is cured;
   drilling said well bore using said settable drilling fluid;
   running said pipe string to be cemented into said well bore;
   displacing said drilling fluid composition out of said pipe string; and
   allowing said settable drilling fluid in the annulus between the pipe string and the walls of said well bore to set.

2. The method of claim 1 wherein said oil is selected from the group consisting of diesel oil, internal olefins, mineral oil and long chain esters and is present in said oil external emulsion in an amount in the range of from about 50% to about 90% by weight thereof.

3. The method of claim 1 wherein said water is selected from the group consisting of fresh water and salt water and is present in said oil external emulsion in an amount in the range of from about 5% to about 45% by weight thereof.

4. The method of claim 1 wherein said emulsifying surfactant is a tall oil diethanolamide and is present in said oil external emulsion in an amount in the range of from about 2.3% to about 7.5% by weight thereof.

5. The method of claim 1 wherein said emulsifying surfactant is oxidized tall oil containing oxidized fatty acids and is present in said oil external emulsion in an amount in the range of from about 1.0% to about 1.6% by weight thereof.

6. The method of claim 1 wherein said hydraulically settable component is selected from the group consisting of ASTM Class F fly ash together with lime, Portland cement, blast furnace slag, a mixture of silica fume, pozzolan and lime, a mixture of Portland cement and blast furnace slag, and a mixture of Portland cement and pozzolan, said hydraulically settable component being present in said composition in an amount in the range of from about 100% to about 250% by weight of said oil external emulsion.

7. The method of claim 1 wherein said de-emulsifying surfactant is an ethoxylated nonylphenol and is present in said composition in an amount in the range of from about 0.3% to about 2.5% by weight of said oil external emulsion therein.

8. The method of claim 1 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

9. The method of claim 1 wherein said settable spotting fluid composition has a density in the range of from about 11 to about 13 pounds per gallon.

10. A method of drilling a well bore and cementing a pipe string in said well bore comprising the steps of:
    preparing an oil-containing settable drilling fluid composition comprising an oil external emulsion which comprises oil, water and an emulsifying surfactant; a hydraulically settable component; an activator for said hydraulically settable component selected from the group consisting of calcium chloride, zinc acetate, zinc formate and mixtures thereof; and a de-emulsifying surfactant for de-emulsifying said oil-external emulsion when said emulsion is cured;
    drilling said well bore using said settable drilling fluid;
    running said pipe string to be cemented into said well bore;
    displacing said drilling fluid composition out of said pipe string; and
    allowing said settable drilling fluid in the annulus between the pipe string and the walls of said well bore to set.

11. The method of claim 10 wherein said oil is selected from the group consisting of diesel oil, internal olefins, mineral oil and long chain esters and is present in said oil external emulsion in an amount in the range of from about 50% to about 90% by weight thereof.

12. The method of claim 10 wherein said water is selected from the group of fresh water and salt water and is present in said oil external emulsion in an amount in the range of from about 5% to about 45% by weight thereof.

13. The method of claim 10 wherein said emulsifying surfactant is a tall oil diethanolamide and is present in said oil external emulsion in an amount in the range of from about 2.3% to about 7.5% by weight thereof.

14. The method of claim 10 wherein said emulsifying surfactant is oxidized tall oil containing oxidized fatty acids and is present in said oil external emulsion in an amount in the range of from about 1.0% to about 1.6% by weight thereof.

15. The method of claim 10 wherein said hydraulically settable component is Portland cement and is present in said composition in an amount in the range of from about 100% to about 250% by weight of said oil external emulsion therein.

16. The method of claim 10 wherein said activator is present in said composition in an amount in the range of from about 2% to about 4% by weight of said hydraulically settable component therein.

17. The method of claim 10 wherein said de-emulsifying surfactant is an ethoxylated nonylphenol and is present in said composition in an amount in the range of from about 0.3% to about 2.5% by weight of said oil external emulsion therein.

18. The method of claim 10 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

19. A method of drilling a well bore and cementing a pipe string in said well bore comprising the steps of:
    preparing an oil-containing settable drilling fluid composition comprising an oil external emulsion which comprises oil, water and an emulsifying surfactant; a hydraulically settable component; an activator for said hydraulically settable component selected from the group consisting of calcium hydroxide, sodium hydroxide, sodium silicate and mixtures thereof; and a de-emulsifying surfactant for de-emulsifying said oil-external emulsion when said emulsion is cured;
    allowing said settable drilling fluid in the annulus between the pipe string and the walls of said well bore to set.

20. The method of claim 19 wherein said oil is selected from the group consisting of diesel oil, internal olefins, mineral oil and long chain esters and is present in said oil external emulsion in an amount in the range of from about 50% to about 90% by weight thereof.

21. The method of claim 19 wherein said water is selected from the group of fresh water and salt water and is present in said oil external emulsion in an amount in the range of from about 5% to about 45% by weight thereof.

22. The method of claim 19 wherein said emulsifying surfactant is a tall oil diethanolamide and is present in said oil external emulsion in an amount in the range of from about 2.3% to about 7.5% by weight thereof.

23. The method of claim 19 wherein said emulsifying surfactant is oxidized tall oil containing oxidized fatty acids and is present in said oil external emulsion in an amount in the range of from about 1.0% to about 1.6% by weight thereof.

24. The method of claim 19 wherein said hydraulically settable component is blast furnace slag and is present in said composition in an amount in the range of from about 100% to about 250% by weight of said oil external emulsion therein.

25. The method of claim 19 wherein said activator is present in said composition in an amount in the range of from about 2.5% to about 15% by weight of said hydraulically settable component therein.

26. The method of claim 19 wherein said de-emulsifying surfactant is an ethoxylated nonylphenol and is present in said composition in an amount in the range of from about 0.3% to about 2.5% by weight of said oil external emulsion therein.

27. The method of claim 19 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

28. A method of drilling a well bore and cementing a pipe string in said well bore comprising the steps of:

preparing an oil-containing settable drilling fluid composition comprising an oil external emulsion which comprises oil, water and an emulsifying surfactant; a mixture of silica fume and pozzolan wherein the weight ratio of silica fume to pozzolan is about 40:60; an activator for said mixture of silica fume and pozzolan comprising lime; and a de-emulsifying surfactant for de-emulsifying said oil-external emulsion when said emulsion is cured;

drilling said well bore using said settable drilling fluid;

running said pipe string to be cemented into said well bore;

displacing said drilling fluid composition out of said pipe string; and allowing said settable drilling fluid in the annulus between the pipe string and the walls of said well bore to set.

29. The method of claim 28 wherein said oil is selected from the group consisting of diesel oil, internal olefins, mineral oil and long chain esters and is present in said oil external emulsion in an amount in the range of from about 50% to about 90% by weight thereof.

30. The method of claim 28 wherein said water is selected from the group of fresh water and salt water and is present in said oil external emulsion in an amount in the range of from about 5% to about 45% by weight thereof.

31. The method of claim 28 wherein said emulsifying surfactant is a tall oil diethanolamide and is present in said oil external emulsion in an amount in the range of from about 2.3% to about 7.5% by weight thereof.

32. The method of claim 28 wherein said emulsifying surfactant is oxidized tall oil containing oxidized fatty acids and is present in said oil external emulsion in an amount in the range of from about 1.0% to about 1.6% by weight thereof.

33. The method of claim 28 wherein said mixture of silica fume and pozzolan is present in said composition in an amount in the range of from about 100% to about 200% by weight of said oil external emulsion therein.

34. The method of claim 28 wherein said lime activator is present in said composition in an amount of about 15% by weight of said silica fume and pozzolan therein.

35. The method of claim 28 wherein said de-emulsifying surfactant is an ethoxylated nonylphenol and is present in said composition in an amount in the range of from about 0.3% to about 2.5% by weight of said oil external emulsion therein.

36. The method of claim 28 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

37. A method of drilling a well bore and cementing a pipe string in said well bore comprising the steps of:

preparing an oil-containing settable drilling fluid composition comprising an oil external emulsion which comprises oil, water and an emulsifying surfactant; a mixture of Portland cement and blast furnace slag having a weight ratio of Portland cement to blast furnace slag in the range of from about 80:20 to about 60:40; an activator for said mixture of Portland cement and blast furnace slag comprising lime; and a de-emulsifying surfactant for de-emulsifying said oil-external emulsion when said emulsion is cured;

drilling said well bore using said settable drilling fluid;

running said pipe string to be cemented into said well bore;

displacing said drilling fluid composition out of said pipe string; and allowing said settable drilling fluid in the annulus between the pipe string and the walls of said well bore to set.

38. The method of claim 37 wherein said oil is selected from the group consisting of diesel oil, internal olefins, mineral oil and long chain esters and is present in said oil external emulsion in an amount in the range of from about 50% to about 90% by weight thereof.

39. The composition of claim 37 wherein said water is selected from the group of fresh water and salt water and is present in said oil external emulsion in an amount in the range of from about 5% to about 45% by weight thereof.

40. The method of claim 37 wherein said emulsifying surfactant is a tall oil diethanolamide and is present in said oil external emulsion in an amount in the range of from about 2.3% to about 7.5% by weight thereof.

41. The method of claim 37 wherein said emulsifying surfactant is oxidized tall oil containing oxidized fatty acids and is present in said oil external emulsion in an amount in the range of from about 1.0% to about 1.6% by weight thereof.

42. The method of claim 37 wherein said mixture of Portland cement and blast furnace slag is present in said composition in an amount in the range of from about 100% to about 250% by weight of said oil external emulsion therein.

43. The method of claim 37 wherein said lime activator is present in said composition in an amount in the range of from about 2.5% to about 15% by weight of said mixture of Portland cement and blast furnace slag.

44. The method of claim 37 wherein said de-emulsifying surfactant is an ethoxylated nonylphenol and is present in said composition in an amount in the range of from about 0.3% to about 2.5% by weight of said oil external emulsion therein.

45. The method of claim 37 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

46. A method of drilling a well bore and cementing a pipe string in said well bore comprising the steps of:
    preparing an oil-containing settable drilling fluid composition comprising an oil external emulsion comprised of oil, water and an emulsifying surfactant; a mixture of Portland cement and pozzolan having a weight ratio of Portland cement to pozzolan of about 50:50; an activator for said mixture of Portland cement and pozzolan comprising lime; and a de-emulsifying surfactant for de-emulsifying said oil-external emulsion when said emulsion is cured;
    drilling said well bore using said settable drilling fluid;
    running said pipe string to be cemented into said well bore;
    displacing said drilling fluid composition out of said pipe string; and
    allowing said settable drilling fluid in the annulus between the pipe string and the walls of said well bore to set.

47. The method of claim 46 wherein said oil is selected from the group consisting of diesel oil, internal olefins, mineral oil and long chain esters and is present in said oil external emulsion in an amount in the range of from about 50% to about 90% by weight thereof.

48. The method of claim 46 wherein said water is selected from the group of fresh water and salt water and is present in said oil external emulsion in an amount in the range of from about 5% to about 45% by weight thereof.

49. The method of claim 46 wherein said emulsifying surfactant is a tall oil diethanolamide and is present in said oil external emulsion in an amount in the range of from about 2.3% to about 7.5% by weight thereof.

50. The method of claim 46 wherein said emulsifying surfactant is oxidized tall oil containing oxidized fatty acids and is present in said oil external emulsion in an amount in the range of from about 1.0% to about 1.6% by weight thereof.

51. The method of claim 46 wherein said mixture of Portland cement and pozzolan is present in said composition in an amount in the range of from about 100% to about 200% by weight of said oil external emulsion therein.

52. The method of claim 46 wherein said lime activator is present in said composition in an amount in the range of from about 2.5% to about 15% by weight of said mixture of Portland cement and pozzolan therein.

53. The method of claim 46 wherein said de-emulsifying surfactant is an ethoxylated nonylphenol and is present in said composition in an amount in the range of from about 0.3% to about 2.5% by weight of said oil external emulsion therein.

54. The method of claim 46 wherein said de-emulsifying surfactant is selected from the group consisting of triethanolamine condensate polymer and quaternized triethanolamine condensate polymer and is present in said composition in an amount in the range of from about 0.3% to about 3.0% by weight of said oil external emulsion therein.

* * * * *